Sept. 16, 1930.   A. T. SPONAR   1,776,239
GAS WATER HEATER
Filed Sept. 7, 1927   2 Sheets-Sheet 2
FIG. II.
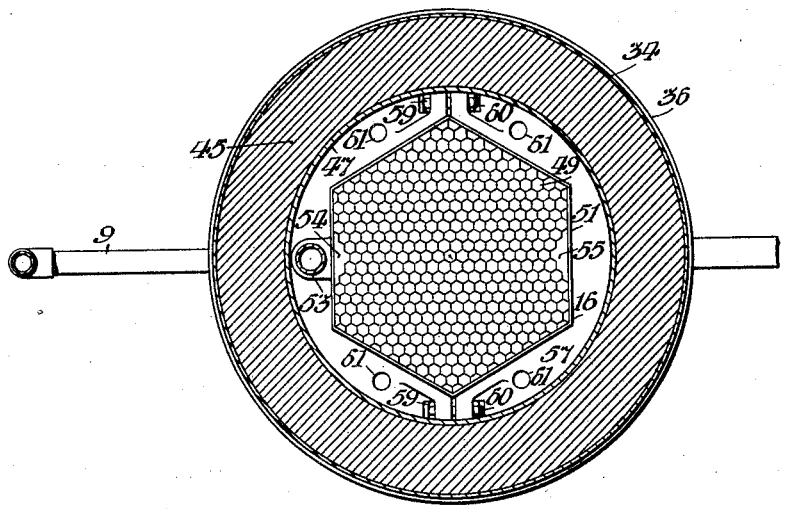
FIG. IV.
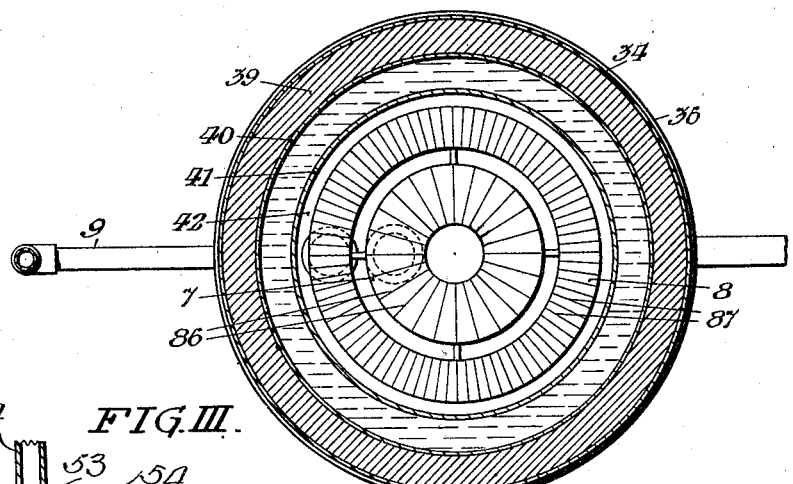
FIG. III.
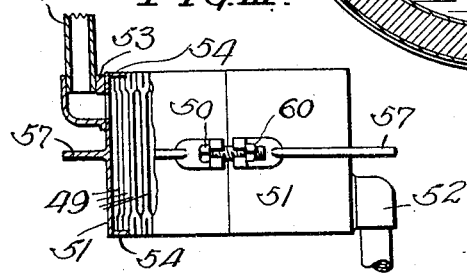
INVENTOR:
ALOYSIUS T. SPONAR, Patented Sept. 16, 1930

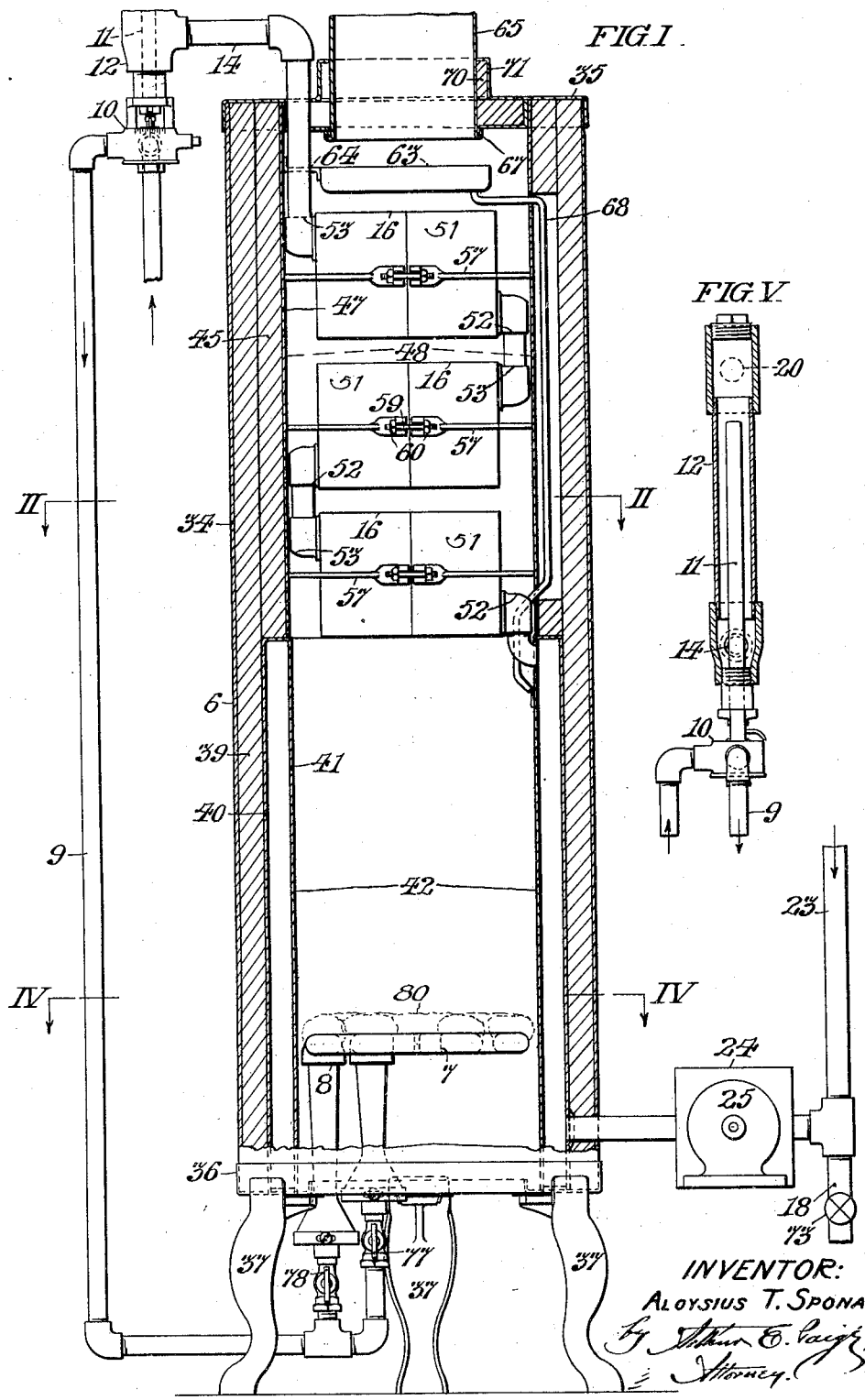

1,776,239

UNITED STATES PATENT OFFICE

ALOYSIUS T. SPONAR, OF CONSHOHOCKEN, PENNSYLVANIA, ASSIGNOR TO JOHN WOOD MANUFACTURING COMPANY, OF CONSHOHOCKEN, PENNSYLVANIA, A CORPORATION OF PENNSYLVANIA

GAS WATER HEATER

Application filed September 7, 1927. Serial No. 218,013.

My invention relates to heaters adapted for use in house heating systems and including, in cooperative relation with a gas burner, a water container of what is known as "honeycomb" or similar cellular construction, and preferably includes means for maintaining a forced circulation of water within the heating system, conveniently by an electrically operative pump; the operation of the device being controlled by thermostatically operative means.

It is the object and effect of my invention to minimize the combustion of gas and conserve the heat generated so as to attain the maximum efficiency of the application of the heat to the water in the circulatory system.

My invention includes the various novel features of construction and arrangement hereinafter more definitely specified.

In said drawings: Fig. I is a front elevation of a heater and its appurtenances conveniently embodying my invention.

Fig. II is a plan sectional view of said heater, taken on the line II, II in Fig. I.

Fig. III is a fragmentary vertical sectional view of the upper heater unit shown in Fig. I.

Fig. IV is a plan sectional view of said heater, taken on the line IV, IV in Fig. I.

Fig. V is a fragmentary vertical sectional view showing the construction and arrangement of the thermostatic controlling means.

Referring to Fig. I; the house or other building 1 comprising rooms or other inclosures 2 and 3, has, preferably in the cellar 4 thereof, the heater 6 inclosing the burners 7 and 8 supplied with gas from the conduit 9 under control of a thermostatically operative valve in the casing 10. Said valve casing carries the tubular thermostatic element 11, extending within the water conduit 12 which is connected with the pipe 14 through which hot water is delivered from the cellular heater units 16 which are supplied with cold water through the pipe 18. Said conduit 12 is connected by pipes 20 with radiator units 21, from which the water is returned through pipes 23 to the pump 24, which is connected to said pipe 18 and arranged to be operated by the electric motor 25, under control of the thermostatically operative switches 27. Said pump may be operated to circulate the water in either direction through the system; it being possible to burn more gas in the heater without melting the soldered joints thereof if the water is circulated upwardly through the heater; but downward circulation of the water through the heater effects a more efficient interchange of temperatures; the products of combustion passing from the heater being at lower temperatures when the water is circulated downwardly.

Said radiator units 21 are provided with respective rotary fans 29 operated by electric motors 30 under control of respective thermostatically operative electric switches 32.

The heater 6 shown in Figs. I, II and IV comprises the outer cylindrical shell 34 having the circular head 35 and bottom plate 36; the latter provided with three legs 37, preferably detachably connected therewith. Said shell 34 is provided with the insulating lining 39 surrounding the water jacket comprising the outer shell 40 and the inner shell 41, which latter incloses the combustion chamber 42. Above said water jacket, said shell 34 is provided with a second inner cylindrical insulating lining 45 supported by the inner cylindrical shell 47 which incloses the flue chamber 48 containing said cellular heater units 16, which are all alike and constructed and arranged as best shown in Figs. I and II.

Each of said heater units 16 includes a congeries of thin copper tubes 49 which are primarily cylindrical but which are enlarged to hexagonal form at their opposite ends where they are soldered together so as to form passages through them for products of combustion from said burners 7 and 8. The intermediate cylindrical portions of said tubes 49 being in spaced relation, afford a water space surrounding them inclosed by the hexagonal shell 51. Each of said heater units is provided with an inlet fitting 52 and an outlet fitting 53, preferably upon respectively opposite sides thereof, and in communication with said water space. I find it convenient to omit a few of the tubes 49 adjacent to the walls of the shell 51 at said inlets and outlets and to seal the openings thus afforded, at top and bottom thereof, by solder, as indicated at 54 and 55 in Fig. II. Such construction facilitates the circulation of the water through said units which are connected in series with the space in said jacket 40, 41, as indicated in Fig. I.

Each of said heater units 16 is provided with a baffle flange 57, of circular configuration, and extending from the hexagonal shell 51 to said cylindrical shell 47, as indicated in Fig. II. I find it convenient to form said baffle flange of two substantially semicircular sections which are alike and which are conveniently clamped together upon the hexagonal shell 51 by bolts 59 and nuts 60.

Although said baffle plates 57 may be imperforate; I prefer to perforate them as indicated at 61, so that although said baffles insure that the major portion of the products of combustion shall pass through the tubes 49; said perforations 61 insure that all of the products of combustion shall be kept in motion through the heater 6.

However, the escape of the products of combustion from said heater 6 is further baffled by the drip pan 63 which is conveniently attached to said shell 47 by several brackets 64 and which is preferably of larger diameter than the flue pipe 65 which extends to a suitable chimney in the wall of the building 1 and may be provided with dampers and other appurtenances. The products of combustion passing through said flue pipe 65 always contain more or less moisture which, particularly at the beginning of the operation of the heater, is condensed upon the inner face of said pipe. Therefore, in order to dispose of the condensate, without interference with operation of the heater, I provide said circular head 35 with the drip flange 67 surrounding said flue pipe 65 and overhanging said drip pan 63, so that the condensed water drips from said flange into said pan, and provide said pan with the vent pipe 68 which discharges the condensate against the inner shell 41 of the water jacket from which it is revaporized and passes to the outer atmosphere through the flue pipe and chimney when the temperature of the latter reaches the degree which is characteristic of the normal operation of the heater. Such construction and arrangement avoid the necessity of any manual operation to dispose of the condensate which is, during the initial operation of the heater, of such amount as to materially interfere with the operation of the heater unless means be provided to dispose of the same as aforesaid.

In order to prevent chilling of the head 35 at the top of the heater adjoining said flue pipe 65, by absorption of heat by the latter; I find it highly desirable to provide the lower portion of said pipe 65 with an annular band 70 of insulating material, retained by the tubular upward extension 71 on said head.

The apparatus above described may be operated as follows: The water circulating system including said heater 6, being empty; it may be charged with cold water by opening the valve 73 in the cold water supply pipe 18 and suitable air vents 74 which may be conveniently located at the radiators 21 and which latter must be closed when the air has been discharged from the system and replaced by water. Thereupon, the stop cocks 77 and 78 respectively controlling the supply of gas to the burners 7 and 8, are opened, and the gas ignited at said burners in flames 80. The products of combustion mixed with atmospheric air pass upwardly through the tubes 49 of the cellular units 16; being baffled by the flanges 57 local to each of said units but being free to circulate laterally within the flue chamber 48 confined by the inner shell 47; so as to uniformly distribute the products of combustion and the heat units thereof with respect to the total area of said heater units 16. The heat units of the products of combustion having been thus absorbed by the water in the system, the waste gases pass around the edge of the drip pan 63 and upwardly in the flue pipe 65 in which, at the beginning of the operation, the moisture is condensed and drips from the flange 67 into said pan 65 and flows thence through the vent pipe 68 against the inner shell 41 of the water jacket from which it is revaporized and ultimately passes to the outer atmosphere when the temperature of said flue pipe 65 and the chimney is increased to such a degree that the moisture is no longer condensed thereon but carried to the outer atmosphere with the waste gases.

During the aforesaid operation of heating the water in the system, the water is forced to circulate by the action of the pump 24 at a greater rate than would be possible with the ordinary convection currents, so that the radiators 21 are heated quicker, and more efficiently thereafter, than if said pump were omitted. As above contemplated, the operation of said pump 24 is controlled and its speed of operation is variable by the operation of its electric motor 25 under control of the thermostatic switches 27. Moreover, the rapidity of circulation of air through the radiators 21 from the inlets 83 at the bottom thereof to the outlets 84 at the top thereof, may be varied by varying the operation of the fan motor 30 under control of the thermostats 32.

However, it is to be understood that it is not essential that my improved heater shall be embodied in such a water circulating system as indicated in Fig. I, as it may be advantageously employed to heater water in an embodiment of any kind.

Although I find it desirable to make the gas jet orifices in the burners 7 and 8 by saw cuts 86 and 87, as indicated in Fig. IV; my invention is not limited to burners of that type. However, I find it advantageous and economical to employ a plurality of burners which are separately supplied with gas, as above contemplated, to insure thorough mixture of the gas with the atmospheric air for each burner. It is not as satisfactory to employ a single burner of the large capacity required for such a heater as above described with a single gas inlet thereto; for the reason that after a predetermined temperature of the radiator is reached; say, 140° F.; the volume and consequent pressure of the gas supplied to the heater is reduced, by the automatic operation of the thermostatic valve in the casing 10, to such an extent that the force with which it is injected into the burner is not sufficient to effect the most efficient mixture thereof with the volume of atmospheric air required for complete combustion.

Therefore, I do not desire to limit myself to the precise details of construction and arrangement herein set forth, as it is obvious that various modifications may be made therein without departing from the essential features of my invention, as defined in the appended claims.

I claim:

1. In a gas water heater, the combination with an outer cylindrical casing; of an insulating lining for said casing; a gas burner in the lower portion of said casing; a flue pipe extending from the upper portion of said casing and terminating immediately within the upper wall of said casing; a drip flange at the lower end of said flue pipe, within said casing; a drip pan, in the upper portion of said casing above the heater units and arranged to shield the latter, of larger diameter than said drip flange and spaced below the latter and arranged to receive and aggregate the drip from said flange; a vent pipe from said drip pan, arranged to discharge condensate therefrom against the inner surface of the wall surrounding said burner, above the latter; a series of cellular heater units, in vertically spaced relation between said burner and said drip pan; each of said units having baffle means extending from it to the adjoining wall of said casing and preventing the passage of products of combustion from said burner around said units; and means arranged to circulate water in said units adjacent to passageways for products of combustion; said pan being above all of the water containing units in said casing, and in spaced relation therewith; whereby the heated products of combustion from said burner heat the water in said units and the moisture condensed from said products in said flue pipe is caught in said drip pan, above said units, and returned into the combustion chamber to be revaporized.

2. In a gas water heater, the combination with an outer metallic casing; of a lining of heat insulating material in said casing; a tubular water jacket within the lower portion of said casing, inclosing a combustion chamber; a burner in said combustion chamber; a series of heater units in vertically spaced relation within said casing above said water jacket, each comprising a congeries of vertically extending flue tubes, expanded to polygonal form and connected together at their upper and lower ends, and a casing shell, of the same polygonal form, connected to the ends of said tubes and affording a water space around them within the respective unit; each of said units having an inlet and an outlet, in communication with said water space, at respectively opposite sides of the unit; each of said units having baffle means extending from it to the adjoining wall of said casing and preventing the passage of products of combustion from said burner around said units; water conducting means connecting said water jacket with said heater units, in series relation; a water supply inlet to said jacket; and a hot water discharge outlet from the top heater unit; whereby products of combustion from said burner are compelled to pass thru said flue tubes of each of said units in succession, and first heat the water in said jacket and thereafter heat the water in said units, in series relation, and the water is compelled to circulate vertically from said jacket and substantially horizontally back and forth through the water spaces in said units.

3. In a gas water heater, the combination with an outer casing; a tubular water jacket within said casing, extending about half way from the bottom to the top of said heater, and inclosing a combustion chamber; a flue chamber within said casing, above said jacket; a plurality of gas burners in said combustion chamber, near the bottom thereof; a single gas supply conduit having branches leading to the respective burners; a valve arranged to control said gas conduit; a thermostat arranged to operate said gas valve; a series of cellular heater units in vertically spaced relation in said flue chamber; baffle flanges upon each of said units and extending to the side wall of said flue chamber, arranged to compel the bulk of the products of combustion from said burner to pass in succession through said heater units; water conducting means connecting said water jacket with said heater units, in series relation; a cold water supply inlet leading to said jacket; a hot water discharge conduit extending from the top heater unit, in cooperative relation with said thermostat; a flue pipe extending from the top of said heater, in communication with said flue chamber; a drip flange extending into said flue chamber around said flue pipe; a drip pan in said flue chamber in spaced relation with the top thereof and above said units, arranged to baffle the escape of said products of combustion and receive water dripping from said drip flange; and a vent pipe extending from said drip pan downwardly in said heater in position to discharge the liquid contents of said pan against the inner surface of said water jacket; whereby the operation of said burner is automatically controlled in accordance with the temperature of the water in said discharge conduit and moisture condensed from the products of combustion from said burner is returned into the combustion chamber, aside from said units, and revaporized.

4. In a gas water heater, the combination with an outer vertical cylindrical metal casing; of head and bottom closures for said casing; insulating linings for said closures; an insulating lining in and coextensive with said casing; a tubular water jacket within said lining, extending about half way from the bottom to the top of said heater, and inclosing a combustion chamber; a second insulating lining, extending from the top of said water jacket to the top of said heater; a metallic shell within said second lining and inclosing a flue chamber; a plurality of gas burners in said combustion chamber, near the bottom thereof; a single gas supply conduit having branches leading to the respective burners; a valve arranged to control said gas conduit; a thermostat arranged to operate said gas valve; a series of cellular heater units in vertically spaced relation in said flue chamber; baffle flanges formed of opposite counterpart sections clamped upon said units and extending to the side of said flue chamber, arranged to compel the bulk of the products of combustion from said burners to pass in succession through said heater units; water conducting means connecting said water jacket with said heater units, in series relation; a cold water supply inlet leading to said jacket; a pump operative to force water through said inlet; a hot water discharge conduit extending from the top heater unit, and inclosing said thermostat; a flue pipe extending from the top of said heater, in communication with said flue chamber; an annular insulating band around said flue pipe adjoining the heater top; a drip flange extending into said flue chamber around said flue pipe; a drip pan in said flue chamber in spaced relation with the top thereof and above said units, arranged to baffle the escape of said products of combustion and receive water condensate dripping from said drip flange; and a vent pipe extending from said drip pan downwardly in said heater, in position to discharge the liquid contents of said pan against the inner surface of said water jacket; whereby the operation of said burners is automatically controlled in accordance with the temperature of the water in said discharge conduit, and moisture condensed from the products of combustion from said burner is returned into the combustion chamber, aside from said unit and revaporized.

5. In a gas water heater, the combination with an outer metallic casing; of a lining of heat insulating material in said casing; a gas burner in the lower portion of said casing; a flue pipe extending from the upper portion of said casing; a tubular water jacket within the lower portion of said casing, surrounding said burner; a series of cellular heater units, in vertically spaced relation within said casing above said water jacket, each comprising a congeries of vertically extending flue tubes, with a water space around them within the respective unit; each of said units having baffle means compelling the products of combustion to pass thru the flue tubes of the respective units in succession and an inlet and an outlet, in communication with the water space in said unit, at respectively opposite sides thereof; whereby the water is compelled to traverse said units laterally, in alternately opposite directions; water conducting means connecting said water jacket with said heater units, in series relation; a water supply inlet to said jacket; and a water discharge outlet from the top heater unit; whereby products of combustion from said burner first heat the water in said jacket and thereafter heat the water in said units, in series relation, and the water is compelled to circulate substantially horizontally back and forth through the water spaces in said units.

6. In a gas water heater, the combination with an outer casing; of a lining of heat insulating material in said casing; a gas burner in the lower portion of said casing; a water container in said casing, in cooperative relation with said burner; baffle means extending from said container to the inner wall of said casing; a flue pipe extending from the top of said casing, and terminating immediately below the top wall thereof and above said water container; a drip flange at the inner end of said flue pipe, pendent in said casing; a drip pan immediately below said drip flange arranged to catch the drip therefrom; and a vent pipe from said pan arranged to deliver condensate within the combustion chamber above said burner; whereby the water in said container is heated by the products of combustion, and moisture condensed from said products is returned to the combustion chamber and revaporized therein.

7. In a water heater, the combination with a congeries of tubes having hexagonal ends, and connected at their ends; of a hexagonal casing for said congeries; and a baffle flange having an axial hexagonal opening detachably fitted to said casing and extending outwardly from said hexagonal casing, and having a circular perimeter.

8. A device as in claim 7, wherein the flange is formed of substantially semi-circular sections and clamped upon the congeries by screw means.

9. A gas water heater unit comprising a congeries of tubes having their opposite ends expanded and connected together; an annular casing encircling said congeries and inclosing a water space around said tubes; and a baffle flange extending outwardly from said casing, adapted to baffle the products of combustion when said unit is placed in coacting relation with the wall of a flue of a gas water heater.

In testimony whereof, I have hereunto signed my name at Conshohocken, Pennsylvania, this thirteenth day of August, 1927.

ALOYSIUS T. SPONAR.